United States Patent
Wang et al.

(10) Patent No.: US 8,285,552 B2
(45) Date of Patent: Oct. 9, 2012

(54) SYSTEM AND METHOD FOR SIMULATING EXPRESSION OF MESSAGE

(75) Inventors: Wen-Nan Wang, Taichung County (TW); James Lee, Taipei (TW); Wei-Te Chen, Taipei (TW); Tzu-Chen Tsai, Taichung (TW); Eden Hsu, Taipei (TW)

(73) Assignee: Institute for Information Industry, Taipei (TW)

( * ) Notice: Subject to any disclaimer, the term of this patent is extended or adjusted under 35 U.S.C. 154(b) by 367 days.

(21) Appl. No.: 12/631,776

(22) Filed: Dec. 4, 2009

(65) Prior Publication Data

US 2011/0112826 A1 May 12, 2011

(30) Foreign Application Priority Data

Nov. 10, 2009 (TW) .............................. 98138092 A

(51) Int. Cl.
*G10L 21/00* (2006.01)
*G10L 19/00* (2006.01)
*G10L 13/00* (2006.01)

(52) U.S. Cl. ......... 704/272; 704/231; 704/258; 704/270

(58) Field of Classification Search .................. 704/231, 704/258, 270, 272
See application file for complete search history.

(56) References Cited

U.S. PATENT DOCUMENTS

| | | | | |
|---|---|---|---|---|
| 6,959,080 | B2* | 10/2005 | Dezonno et al. | 379/265.07 |
| 7,165,033 | B1* | 1/2007 | Liberman | 704/270 |
| 7,340,393 | B2* | 3/2008 | Mitsuyoshi | 704/207 |
| 7,860,705 | B2* | 12/2010 | Afify et al. | 704/3 |
| 7,949,109 | B2* | 5/2011 | Ostermann et al. | 379/100.08 |
| 7,966,185 | B2* | 6/2011 | Eide | 704/260 |
| 2002/0198717 | A1* | 12/2002 | Oudeyer et al. | 704/270 |
| 2007/0208569 | A1* | 9/2007 | Subramanian et al. | 704/270 |
| 2008/0158334 | A1* | 7/2008 | Reponen et al. | 348/14.02 |
| 2008/0235024 | A1* | 9/2008 | Goldberg et al. | 704/260 |
| 2009/0063154 | A1* | 3/2009 | Gusikhin et al. | 704/260 |
| 2010/0036660 | A1* | 2/2010 | Bennett | 704/231 |
| 2010/0060647 | A1* | 3/2010 | Brown et al. | 345/473 |
| 2010/0082345 | A1* | 4/2010 | Wang et al. | 704/260 |
| 2011/0295607 | A1* | 12/2011 | Krishnan et al. | 704/270 |

FOREIGN PATENT DOCUMENTS

| | | |
|---|---|---|
| CN | 201078848 | 6/2008 |
| TW | M346063 | 12/2008 |

\* cited by examiner

*Primary Examiner* — Douglas Godbold
(74) *Attorney, Agent, or Firm* — Jianq Chyun IP Office

(57) ABSTRACT

A system and a method for simulating expression of a message are provided. The system comprises a network platform end and at least one user end. The network platform end comprises a message capturing module for capturing a user message; a feature analyzing module for performing a characteristic analysis on content of the user message, so as to mark at least one simulation action tag on the message content; and a simulation message generating module for acquiring simulation instructions corresponding to the at least one simulation action tag and combining the same with the message content to generate a simulation message. The user end comprises a user device for receiving the simulation message and outputting the message content and simulation instructions contained in the simulation message to a simulation device; and the simulation device for playing the received message content and executing corresponding simulation instructions.

17 Claims, 8 Drawing Sheets

```
<idoll>
  <services>
    <external service name="plurk">
610 →  <message content type="text"    value="Hello, very glad to tell you: I will hold a concert in Shanghai"/>
620 →  <message content type="tts"     value="http://URL/TTS1.mp3"/>
630 →  <simulation motion emotion="smooth"  timeS="0"   timeE="6"/>
640 →  <simulation motion emotion="joy"     timeS="7"   timeE="10"/>
650 →  <simulation motion emotion="smooth"  timeS="11"  timeE="16"/>
660 →  <simulation motion emotion="joy"     timeS="17"  timeE="20"/>
    </service>
  </services>
</idoll>
```

FIG. 6

SYSTEM AND METHOD FOR SIMULATING EXPRESSION OF MESSAGE

CROSS-REFERENCE TO RELATED APPLICATION

This application claims the priority benefit of Taiwan application serial no. 98138092, filed on Nov. 10, 2009. The entirety of the above-mentioned patent application is hereby incorporated by reference herein and made a part of specification.

BACKGROUND OF THE INVENTION

1. Field of the Invention

The present invention relates to a system and a method for simulating an expression of a message, and more particularly to a system and a method for characteristic analyzing a message content, marking the message content a simulation action tag and then expressing the simulation expression with the use of a simulation device.

2. Description of Related Art

Currently, the interactive entertainment device, such as the electronic doll, the electronic pet, robot or the device with low level calculation capability, can interact with the user to achieve the entertaining effect. For instance, the electronic pet, such as the electronic chicken or electronic dog, can detect the user's sound or motions and accordingly responds the user in a form of facial expression or motion change. Hence, the electronic pet can real-time respond to the user's motion to achieve the interaction effect with the user. Further, the user can utilize additional functionalities, such as food feeding or game playing, to cultivate or establish the interactive relationship with the electronic pet.

However, all the motions or the responses of the interactive entertainment device have to be defined in advance. Further, the interactive entertainment device only can respond to specific instructions (e.g. the button pressing or the sounds) to show simple motions when interacting with the user. That is, the interactive entertainment device cannot feedback the user by simulating the user's message, such as the text message, the voice message or the video message. Although some of the interactive entertainment devices provide the user to customize the interactive effects, the customized interactive effects are limited to be applied on the hardware of the user end and cannot be shared with other users. Thus, the delight for interacting with other people cannot be obtained.

SUMMARY OF THE INVENTION

Accordingly, the present invention provides a system for simulating an expression of a message capable of providing the system manufacturers or users with a means for updating or sharing simulation instructions by configuring a network platform for managing the simulation instructions.

The present invention provides a method for simulating an expression of a message, by applying which the simulation device can perform a simulation response in response to the message content through analyzing the message content, marking the message content with at least one simulation action tag and acquiring the simulation instructions.

The present invention provides a system for simulating an expression of a message, which includes a network platform end and at least a user end. The network platform end is communicated with the user end through a communication network. The network platform end comprises a message capturing module, a feature analyzing module and a simulation message generating module. The message capturing module is used for capturing a user message. The feature analyzing module is used for performing a characteristic analysis on a message content of the user message so as to mark at least one simulation action tag on the message content. The simulation message generating module is used for acquiring a plurality of simulation instructions corresponding to each of the at least one simulation action tag and combining the simulation instructions with the message content to generate a simulation message. Furthermore, the user end comprises a user device and a simulation device. The user device includes a network module for receiving the simulation message through the communication network and a driving module for outputting the message content and the simulation instructions contained in the simulation message to the simulation device. The simulation device is used for receiving the message content and the simulation instructions and for playing the received message content and executing the corresponding simulation instructions.

The invention provides a method for simulating an expression of a message for a network platform end, wherein the network platform end communicates at least a user end through a communication network. The method is to capture the user message and to perform the characteristic analysis on the message content of the user message so as to mark at least one simulation action tag on the message content. Then, a plurality of simulation instructions corresponding to each of the at least one simulation action tag are acquired and combined with the message content to generate a simulation message. Afterward, the simulation message is transmitted to a simulation device of the user end so that the simulation device executes each of the simulation instructions for generating at least a simulation response action.

According to the above description, the system and the method for simulating an expression of a message of the present invention, the simulation response can be achieved by recording the customized simulation instructions on the network platform or the independent simulation device, performing the characteristic analysis on message content of the captured message to determine the simulation instructions to be executed and finally executing the simulation instructions while playing the message content.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 6 is an exemplar of a simulation message according to the first embodiment of the present invention.

DESCRIPTION OF EMBODIMENTS

The present invention can be applied to the existing network services, such as social network, real-time communication, virtual pet and video mail, for establishing a network platform. Further, a simulation process is performed on the received user message, such as the text message, the voice message or the video message, to generate the simulation message and the simulation message is further transmitted to another user end. Thus, the simulation device of another user end can perform the simulation motions according to the message content of the user message (e.g. the expressing ways are varied with the emotions corresponding to the user message). Hence, the simulation of interaction can be achieved and the interactive entertaining effect can be improved. According to the above concept, the following embodiments are provided for describing the steps of the method for simulating an expression of a message and the functionalities of the system and apparatus of the present invention.

Figure 1:
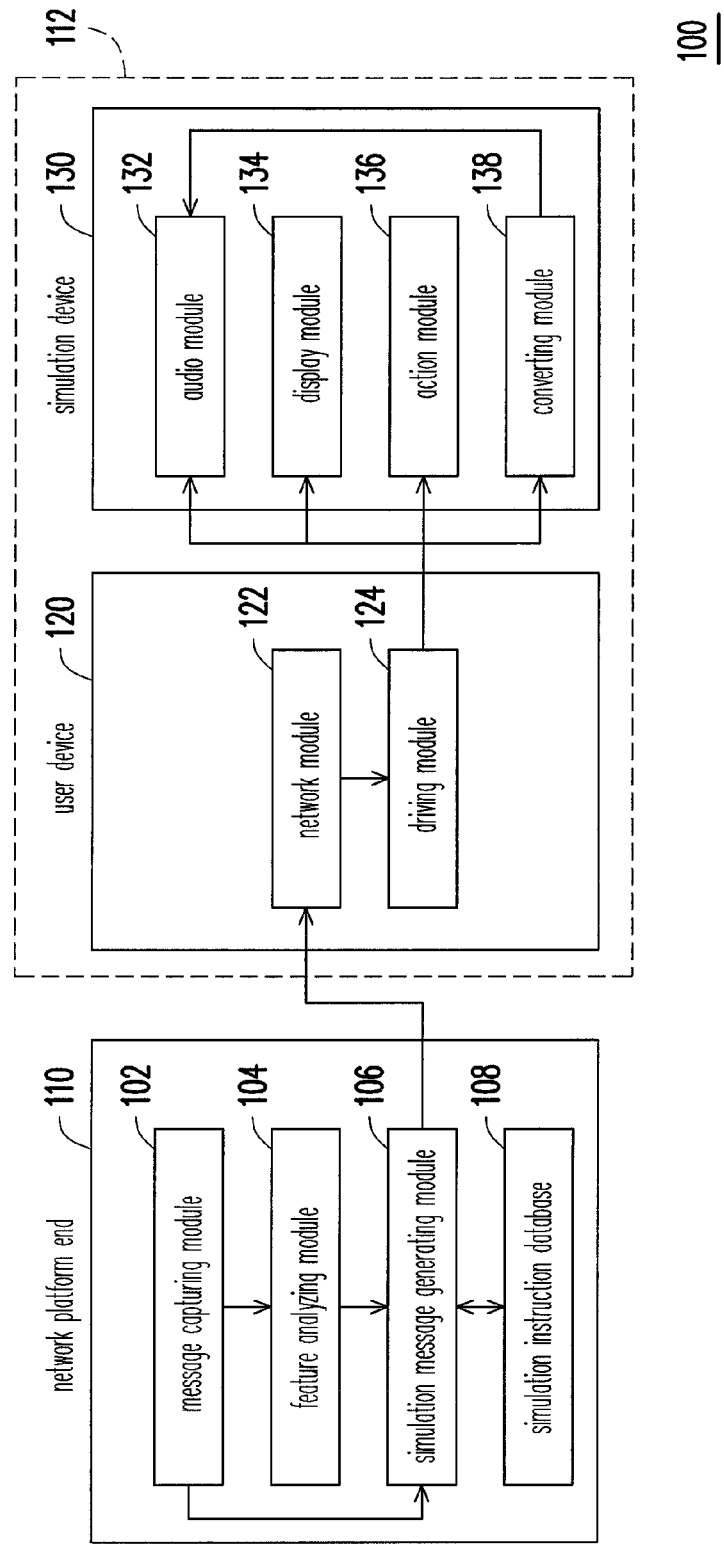
FIG. 1 is a block diagram illustrating a system for simulating an expression of a message according to the first embodiment of the present invention.
Figure 2:
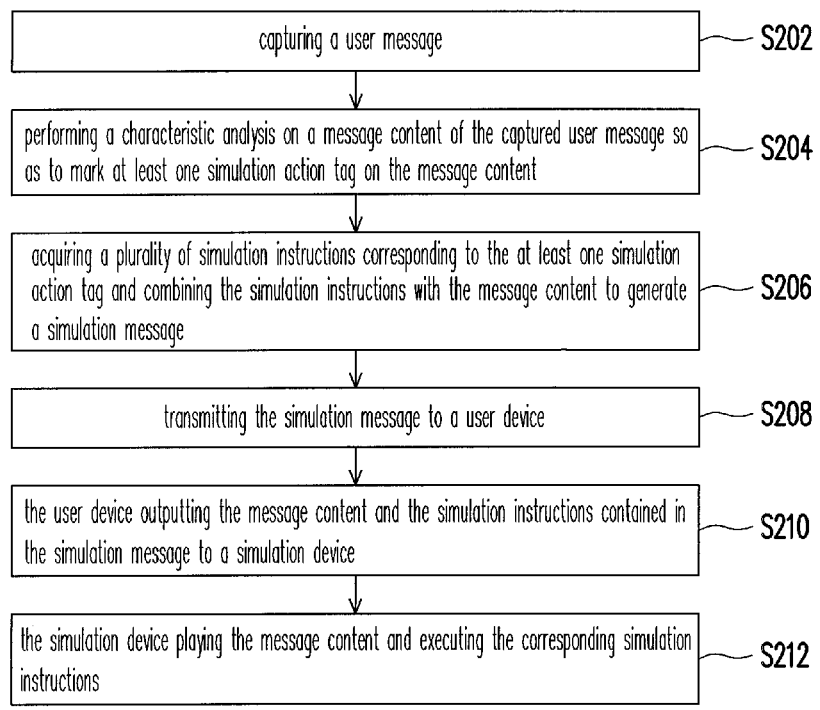
FIG. 2 is a flow chart illustrating a method for simulating an expression of a message according to the first embodiment of the present invention.

FIG. 1 is a block diagram illustrating a system for simulating an expression of a message according to the first embodiment of the present invention, and FIG. 2 is a flow chart illustrating a method for simulating an expression of a message according to the first embodiment of the present invention. As shown in FIG. 1 and FIG. 2, a system 100 mainly comprises a network platform end 110 and at least one user end 112. The network platform end 110 is communicated with the user end 112 through a communication network. The network platform 110 mainly comprises a message capturing module 102, a feature analyzing module 104 and a simulation message generating module 106. The message capturing module 102 is used for capturing a user message. The feature analyzing module 104 is used for performing a characteristic analysis on a message content of the user message so as to mark at least one simulation action tag on the message content. The simulation message generating module 106 is used for acquiring a plurality of simulation instructions corresponding to each of the at least one simulation action tag and combining the simulation instructions with the message content to generate a simulation message. The user end 112 comprises a user device 120 and a simulation device 130. The user device 120 comprises a network module 122 for receiving the simulation message through the communication network and a driving module 124 for outputting the message content and the simulation instructions contained in the simulation message to the simulation device 130. The simulation device 130 is used for receiving the message content and the simulation instructions so as to play the received message content and execute the corresponding simulation instructions. The network platform end 110 can be implemented by at least one server, computer or workstation. Also, the user device 120 can be, for example, a personal computer, a notebook, a portable communication device or any calculators. Furthermore, the simulation device 130 can be, for example, any device for performing the simulation expressions, such as the lighting displaying device, audio playing device, display, electronic doll, electronic pet or robot.

In some embodiments, the message capturing module 102 can be connected to a network service to capture the user message. The network service can be, for example, a social network service, a real-time communication network service, a virtual pet network service or a video mail network service. In another embodiment, the network platform end 110 further comprises a network service module (not shown in FIG. 1) capable of communicating with at least one user end 112. Moreover, the message capturing module 102 can capture the user message through the network service module.

The following description accompanying the elements shown in FIG. 1 is used to explain the steps of a method for simulating an expression of a message of the present embodiment.

The network platform end 110 utilizes the message capturing module 102 to capture a user message (step S202). Further, the network platform end 110 captures the user message in forms of text, voice or video provided from the network service, which can be, for example, selected from a group consisting of social network service, real-time communication network service, virtual pet network service and video mail network service and performs the simulation process on the user message. For instance, the network platform end 110 can automatically capture articles posted on some blogs in the Internet or the instant messages from some contacts and perform the simulation process on these articles or instant messages.

Then, the network platform end 110 utilizes the feature analyzing module 104 to perform a characteristic analysis on a message content of the captured user message so as to mark at least one simulation action tag on the message content (step S204). Moreover, the feature analyzing module 104 can, for example, implement text emotion recognition, voice emotion recognition or facial expression recognition to recognize the emotion features according to the types of the user message captured by the message capturing module 102 so as to mark the emotion features with the corresponding simulation action tags.

Figure 3:
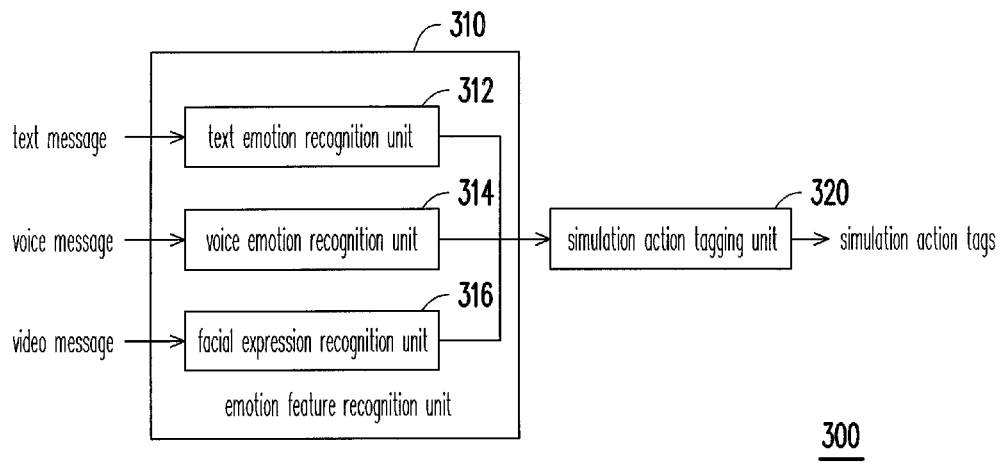
FIG. 3 is a block diagram showing a feature analyzing module according to the first embodiment of the present invention.

FIG. 3 is a block diagram showing a feature analyzing module according to the first embodiment of the present invention. As shown in FIG. 3, the feature analyzing module 300 includes an emotion feature recognition unit 310 and a simulation action tagging unit 320. The emotion feature recognition unit 310 can be further classified as a text emotion recognition unit 312, a voice emotion recognition unit 314 and a facial expression recognition unit 316 according to the types of the message.

If the captured user message is a text message, the captured user message is transmitted to the text emotion recognition unit 312. The text emotion recognition unit 312 performs a text emotion recognition on the message content of the user message to recognize a plurality of text emotion features, such as pleasure, anger, sorrow, joy or smooth. Afterward, the simulation action tagging unit 320 tags the text emotion features with the corresponding simulation action tags. In some embodiments, the text emotion recognition unit 312 can, for example, obtain some emotion keywords of the original corpus by analyzing the terms with the use of the synonym dictionaries or the word segmentation systems and by comparing with the emotion corpus databases, annotate the original corpus to be the emotion case repository having various emotions, then analyze the emotion case repository to build up the emotion model and the ontology related to the emotion, and finally use the emotion case repository as the training construction model of the case-based reasoning system so that the case-based reasoning system can dynamically recognize the emotion features in the user message and tag the simulation action tags. In other embodiments, the text emotion recognition unit 312 can obtain the emotion features according to a semantic analysis function and a decision tree for correspondingly correlating the analyzing results with the emotion features, and further tag the emotion features with the simulation action tags.

For instance, the text emotion recognition unit 312 performs the text emotion recognition on the text message "Hello, very glad to tell you: I will hold a concert in Shanghai" and obtains the text emotion recognition result as shown in table 1. As shown in table 1, by using the semantic analysis, the text emotion recognition unit 312 finds out the emotion features "smooth" and "joy". The simulation action tagging unit 320 tags the text emotion features with the corresponding simulation action tags.

TABLE 1

| Hello | , | very | glad | to | tell | you | : | I will | hold | a concert | in | Shanghai |
|-------|---|------|------|----|------|-----|---|--------|------|-----------|----|----------|
| smooth |  |  | joy |  |  |  |  | smooth |  | joy |  |  |

If the captured user message is a voice message, the captured user message is transmitted to the voice emotion recognition unit 314. Since the conversation content usually implies the emotions to be expressed (such as anger, joy, hate or sorrow) or the voice features (such as pitch, voice frequency or sound volume) for being analyzed to reveal the emotion features, the voice emotion recognition unit 314 of the present embodiment can perform the voice emotion recognition on the content of the user message or the voice features so as to recognize the voice emotion features. Afterward, the simulation action tagging unit 320 tags the voice emotion features with the corresponding simulation action tags.

Figure 4:
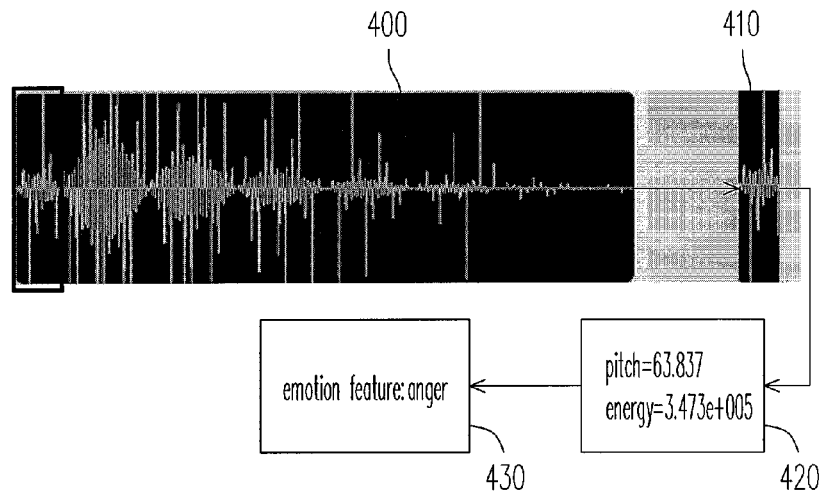
FIG. 4 is an exemplar of voice emotion recognition according to the first embodiment of the present invention.

FIG. 4 is an exemplar of voice emotion recognition according to the first embodiment of the present invention. As shown in FIG. 4, the voice emotion recognition unit 314 divides the captured voice message 400 into several speech frames by using a fixed time interval (such as 0.2 milliseconds). Taking the speech frame 410 as an example, the voice emotion recognition unit 314 extracts the feature values 420 such as the pitch or energy. Then, the feature values are compared with the database based on K nearest neighbor (KNN) technique to obtain K batches of data. The K batches of data are analyzed to determine the emotion feature of the speech frame 410. Accordingly, the voice emotion recognition unit 314 can recognize the emotion features corresponding to other speech frames.

If the captured user message is a video message, the captured user message is transmitted to the facial expression recognition unit 316. The facial expression recognition unit 316 performs a facial feature recognition on a plurality of images included in the message content of the user message to obtain a plurality of facial features of the images. The facial expression recognition unit 316 further recognizes at least a facial expression feature of the images according to the facial features. Afterward, the simulation action tagging unit 320 tags the facial expression features with the corresponding simulation action tags.

Figure 5:
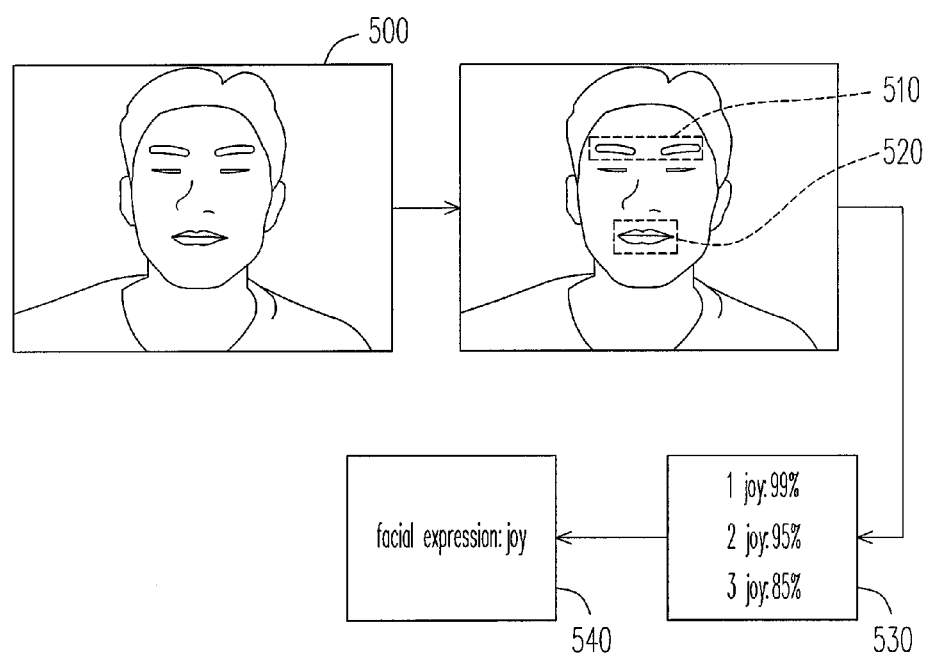
FIG. 5 is an exemplar of facial expression recognition according to the first embodiment of the present invention.
Figure 7:
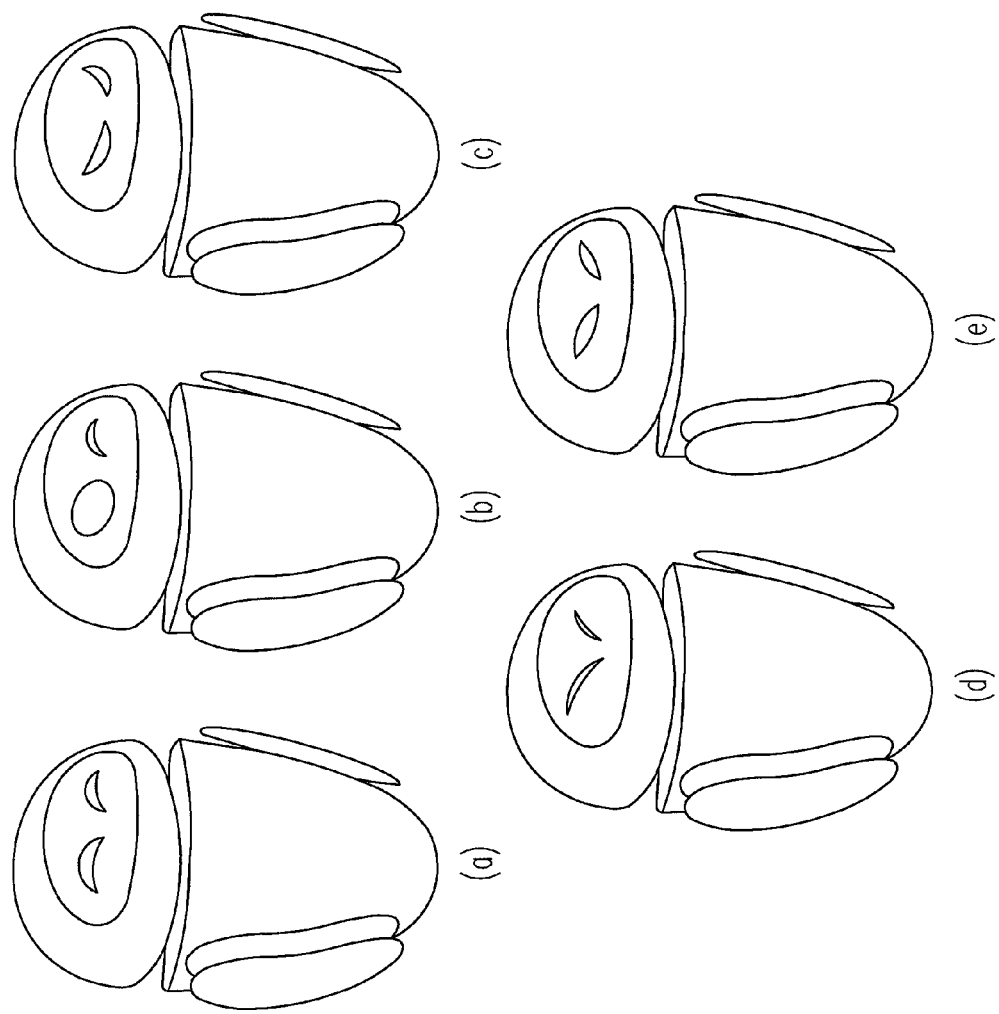
FIGS. 7(*a*) through 7(*e*) are exemplars showing the simulation device executing the simulation instructions according to the first embodiment of the present invention.

In detail, FIG. 5 is an exemplar of facial expression recognition according to the first embodiment of the present invention. As shown in FIG. 5, the facial expression recognition unit 316 performs the facial feature recognition on the image 500 and recognizes positions of the eyebrows 510 and the mouth 520. Then, the recognized eyebrows 510 and the recognized mouth 520 are compared with the data in the database to find out three batches of data 530 with the highest matching scale (including joy 99%, joy 95% and smooth 85%). Last, the three batches of data are analyzed to determine the facial expression of the image 500 as joy 540.

Back to the step S204, after the emotion features are tagged with the simulation action tags, the network platform end 110 uses the simulation message generating module 106 to acquire a plurality of simulation instructions corresponding to the simulation action tags and to combine the simulation instructions with the message content to generate a simulation message (step S206). More specifically, the simulation message generating module 106 can, for example, refer to a simulation instruction database 108 which records the simulation instructions correspondingly correlated to the simulation action tags. The simulation device 130 executes simulation instructions to perform a simulation response action or a series of simulation response actions. For instance, the simulation motion can be twinkle lighting, rotation, vibration, robot motion, giving sounds, or displaying specific image on the screen.

In the other embodiments, different user ends may have different simulation devices 130. Different simulation devices 130 may support different simulation instructions and execute different simulation response actions. Therefore, the network platform end 110 further comprises a user database for recording the simulation devices correspondingly correlated to the user ends. For instance, the user database records the model, the type or the machine code of the simulation device for a specific user end. Also, the simulation instruction database further records at least one simulation instruction corresponding to each of the at least one simulation action tag for the corresponding one of a plurality of simulation devices. Further, the simulation message generating module 106 acquires at least one simulation instruction corresponding to each of the at least one simulation action tag for the corresponding simulation device, which is correspondingly correlated to one of the user ends, according to the user database and the simulation instruction database. Thus, the simulation message generating module 106 combines the acquired simulation instructions with the message content to generate the simulation message.

It should be noticed that the simulation message generating module 106 further marks a time point of each of the emotion features appearing in the message content into the simulation instructions while acquiring the simulation instructions for generating the simulation message. Thus, when the simulation device plays the message content, the simulation instructions can be executed respectively according to the corresponding time points.

FIG. 6 is an exemplar of a simulation message according to the first embodiment of the present invention. As shown in FIG. 6, the present embodiment lists a program code of a simulation message which includes the message content 610, the message type 620 and the simulation instructions 630~660. The simulation instructions 630~660 are not only annotated with the simulation action tags (i.e. smooth, joy) correlated to the emotion features but also annotated with the time points of the emotion features appearing in the message content. For instance, the simulation instruction 630 is annotated with a simulation action tag "smooth" and the emotion feature corresponding to the annotated simulation action tag appears in the message content at the starting time "0" and the ending time "6". Consequently, the simulation message of the present embodiment can real-time express the whole message content and the corresponding simulation response actions.

After the simulation message is generated, the network platform end 110 transmits the simulation message to the user device 120 (step S208). The network platform end 110 further comprises a network service module (not shown) capable of communicating with the user device 120 at the user end 112. The user device 120 can be, for example, connected to the network through the network module 122 and receive the simulation message from the network platform end 110 through the network. Moreover, the user device 120 outputs the message content and the simulation instructions contained in the simulation message to the simulation device 130 through a driving module 124 (step S210).

Finally, the simulation device 130 plays the message content parsed by the user device 120 and executes the corresponding simulation instructions (step S212). More specifically, the simulation device 130, for example, includes an audio module 132 for playing the message content in the simulation message. The simulation device 130 may, for example, comprise a display module 134. While the audio module 132 plays the message content at the time point marked in each of the simulation instructions, the display module 134 executes the simulation instruction to display a simulation expression. The simulation device 130 may, for example, comprise an action module 136. While the audio module 132 plays the message content at the marked time point in the simulation instructions, the action module 136 executes the simulation instruction to express a simulation response action. The simulation device 130 further comprises a converting module 138. While the captured user message is the text message, the converting module 138 converts the message content of the text message into the voice message through a text-to-speech technique (TTS) and provides the voice message for the audio module 132 to play.

FIGS. 7(a) through 7(e) are exemplars showing the simulation device executing the simulation instructions according to the first embodiment of the present invention. As shown in FIGS. 7(a) through 7(e), the simulation device of the present embodiment is a robot and the face of the robot is equipped with a display screen. When receiving the message content and the simulation instructions outputted from the user device (not shown), the simulation device plays the message content by a built-in speaker. Further, in the process of playing the message content, the simulation device further controls the display screen to display different expressions at the marked time points annotated in the simulation instructions so that the user's emotions can be expressed. For instance, in FIG. 7(a), a smooth expression is displayed on the display screen of the robot while the simulation instruction currently executed by the simulation device is annotated with a simulation action tag "smooth". Also, in FIG. 7(b), a surprise expression is displayed on the display screen of the robot while the simulation instruction currently executed by the simulation device is annotated with a simulation action tag "surprise". Accordingly, FIGS. 7(c) through 7(e) respectively shows an anger expression, a joy expression and a fear expression expressed by the simulation device. It should be noticed that the simulation device not only uses the display screen to express the user's expression but also uses the actions of the extremities to express the user's emotions. Thus, the simulation response actions expressed by the simulation device are more close to the current emotions of the user.

To sum up, the system 100 of the present embodiment builds up the network platform end 110 and sets up the simulation instruction database 108 on the network. Therefore, the simulation instructions can be customized for the simulation device 130 to perform various simulation response actions. Also, the system manufacturers can update the simulation instruction database 108 through the network platform end 110 and share different simulation instructions. In addition, the user of the simulation device 130 can self customize the simulation instructions through the user interface of the user device 120 and upload the customized simulation instructions to the simulation instruction database 108. Thus, the customized simulation instructions can be shared with other related contacts through the simulation instruction database 108. Therefore, when receiving the message from the aforementioned user, the related contacts can view the simulation actions expressing the emotion of the aforementioned user through the simulation device. Hence, the purpose for sharing the simulation instructions among people can be achieved.

Noticeably, in the system 100 of the present embodiment, the simulation device 130 is a physical device independent from the user device 120. However, in another embodiment, the simulation device 130 can be also a virtual device configured inside the user device 120. Specifically, the simulation device 130 can be a virtual doll displayed on the screen of the user device 120. The simulation device 130 may cause the speaker of the user device 120 to play the message content and, meanwhile, control the virtual doll on the screen of the user device 120 to perform the simulation response actions defined by the simulation instructions according to the message content and the simulation instructions received by the user device 120.

It should be noticed that in another embodiment, the simulation device 130 can be integrated with the user device 120 to be a physical device. That is, the simulation device 130 and the user device 120 can be integrated to be an electronic doll, which can receive the simulation message from the network platform end 110 and play the message content and execute the simulation instructions contained in the simulation message. The following embodiment is used to explain the details of the integration of the simulation device 130 and the user device 120.

Figure 8:
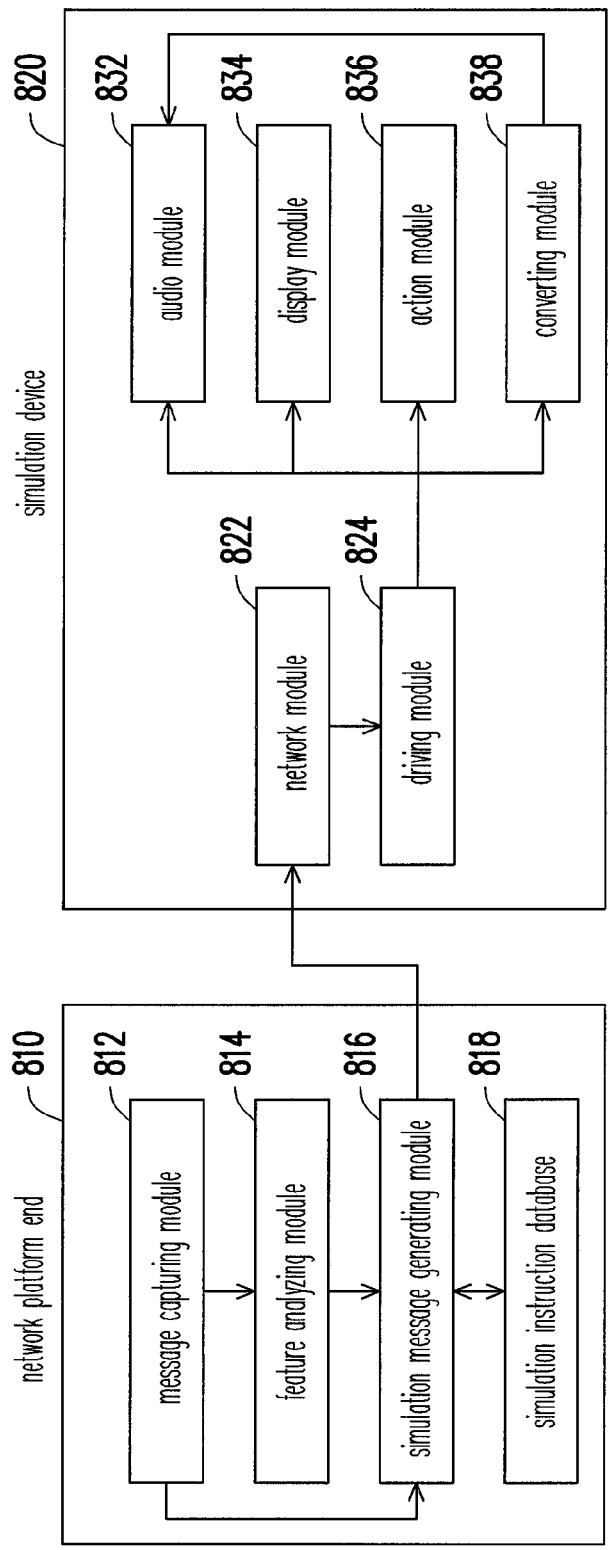
FIG. 8 is a block diagram illustrating a system for simulating an expression of a message according to the second embodiment of the present invention.

FIG. 8 is a block diagram illustrating a system for simulating an expression of a message according to the second embodiment of the present invention. As shown in FIG. 8, the system 800 is divided into two parts including a network platform end 810 and a simulation device 820. The network platform end 810 comprises a message capturing module 812, a feature analyzing module 814, a simulation message generating module 816 and a simulation instruction database 818, which have the functionalities as same as or similar to those of the message capturing module 102, the feature analyzing module 104, the simulation message generating module 106 and the simulation instruction database 108 in the first embodiment and are not detailed herein.

The difference between the first embodiment and the second embodiment is that the simulation device 820 of the present embodiment combines all the elements of the user device 120 and the simulation device 130 in the first embodiment and comprises a network module 822, a driving module 824, an audio module 832, a display module 834, an action module 836 and a converting module 838. The simulation device 820 further integrates the functionalities of the aforementioned modules. For instance, the network module 822 is used to connect to the network and to receive the simulation message from the network platform end 810 through the network. Also, the driving module 824 is used to parse the message content and the simulation instructions in the simulation message. The audio module 832 is used to play the message content in the simulation message. While the audio module 832 plays through the message content at the marked time points annotated in the simulation instructions, the display module 834 executes the simulation instructions to express the simulation expressions or the action module 836 executes the simulation instructions to express the simulation response actions. The converting module 838 converts the message content into a voice message through a text-to-speech technique for being played by the audio module 832.

According to the above description, the system 800 can provide customized simulation instructions and share different simulation instructions through the network platform end 810. Further, the simulation device 820 of the system 800 can individually receive simulation message, directly play the message content, and execute the simulation instructions so as to achieve the purpose of the simulation response.

In another embodiment, the simulation device 820 can further integrate the functions of the network platform end 810 such that the network platform end 810 only provides the functions of the communication with at least one user end and the transmission of at least one message of the user end. Consequently, the simulation device 820 has the functions of the network module, the feature analyzing module, the simulation message generating module, the driving module, and the simulation device, which are similar to or as same as the functions described in the previous embodiment and are not detailed herein.

It should be noticed that, in the aforementioned first embodiment and the second embodiment, the network platform end is set on the network to update and manage the simulation instructions. Moreover, based on the hardware support, the functions of the network platform end can be also integrated into the simulation device for providing more immediate method for simulating an expression of a message. Accordingly, an embodiment is given below for further illustration.

Figure 9:
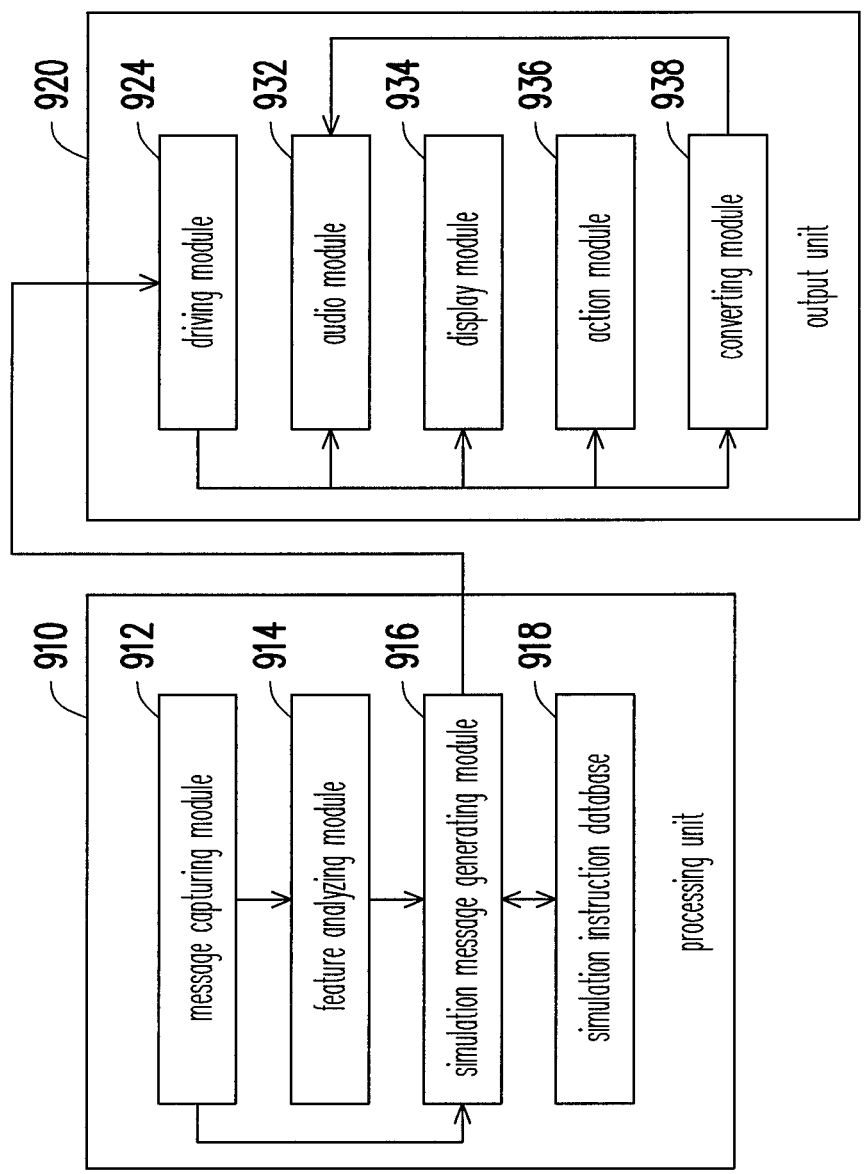
FIG. 9 is a block diagram illustrating an apparatus for simulating an expression of a message according to the third embodiment of the present invention.

FIG. 9 is a block diagram illustrating an apparatus for simulating an expression of a message according to the third embodiment of the present invention. As shown in FIG. 9, the apparatus 900 is divided into two parts including a processing unit 910 and an output unit 920. The processing unit 910 is communicated with the output unit 920 through, for example, a wire connection or a wireless connection. The processing unit 910 comprises a message capturing module 912, a feature analyzing module 914, a simulation message generating module 916 and a simulation instruction database 918, which have the functionalities as same as or similar to those of the message capturing module 102, the feature analyzing module 104, the simulation message generating module 106 and the simulation instruction database 108 in the first embodiment and are not detailed herein.

However, the difference between the present embodiment and the first embodiment is that only a driving module 924, an audio module 932, a display module 934, an action module 936 and a converting module 938 are configured in the output unit 920 of the present embodiment. Hence, the output unit 920 integrates the functions of the aforementioned modules. For instance, the driving module 924 is used to parse the message content and the simulation instructions in the simulation message outputted from the processing unit 920. The audio module 932 is used to play the message content in the simulation message. Further, while the audio module 932 plays the message content at the time point marked in each of the simulation instructions, the display module 934 is used to execute the simulation instruction to display a simulation expression. Also, while the audio module 932 plays the message content at the time point marked in the simulation instructions, the action module 936 is used to execute the simulation instruction to perform a simulation response action. The converting module 938 converts the message content into a voice message through a text-to-speech technique for being played by the audio module 932.

Noticeably, in the apparatus 900 of the present embodiment, the output unit 920 is a physical device independent from the processing unit 910. However, in another embodiment, the output unit 920 can be also a virtual device configured inside the processing unit 910. Specifically, the output unit 920 can be a virtual doll displayed on the screen of the apparatus 900. Thus, the apparatus 900 may cause the speaker to play the message content and, meanwhile, control the virtual doll on the screen of the apparatus 900 to perform the simulation response actions defined by the simulation instructions according to the message content and the simulation instructions received and parsed by the processing unit 910.

It should be noticed that, in another embodiment, the output unit 920 can be integrated with the processing unit 910 to be a physical device. That is, the output unit 920 and the processing unit 910 can be integrated to be an electronic doll, which can analyze the message content of the captured user message to obtain the simulation instructions and directly play the message content and execute the simulation instructions. Accordingly, an embodiment is given below for further illustration.

Figure 10:
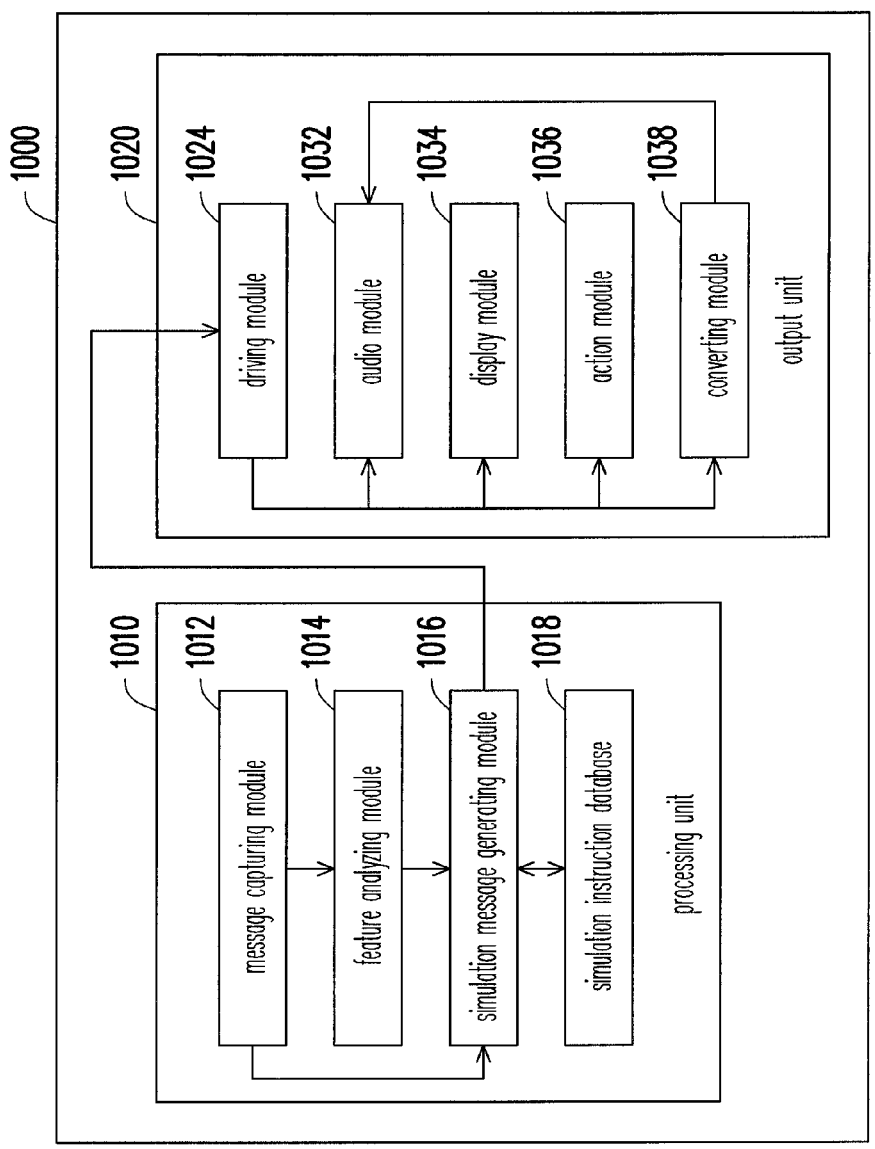
FIG. 10 is a block diagram illustrating an apparatus for simulating an expression of a message according to the fourth embodiment of the present invention.

FIG. 10 is a block diagram illustrating an apparatus for simulating an expression of a message according to the fourth embodiment of the present invention. As shown in FIG. 10, the apparatus 1000 is a physical apparatus which is the integration of a processing unit 1010 and an output unit 1020. The functions of the elements in the processing unit 1010 and the output unit 1020 are as same as or similar to those of the elements in the processing unit 910 and the output unit 920 in the third embodiment.

However, the difference between the present embodiment and the third embodiment is that the apparatus 1000 itself has all functions for simulating an expression of a message of the present invention. Thus, the apparatus 1000 can not only perform the characteristic analysis on the message content of the captured user message, mark the message content with the simulation action tags and acquire the simulation instructions for generating the simulation message, but also parse the simulation message, play the message content and execute the simulation instructions to express the simulation response.

To sum up, in the system, the apparatus and the method for simulating an expression of a message of the present invention, the user's emotion can be sensed by analyzing the text, the voice or the facial expression of the user. Further, by combining the existing text and voice services with the analyzing result, the simulation interaction can be provided. Thus, the user can interact with others through the simulation device, such as the electronic doll. Hence, the entertaining effect and the reality of the interaction are improved.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions. The combinations or the divisions of the modules, units and apparatus of the present invention, or the re-integration of the divisions of the modules, units and apparatus of the present invention still belong to the application of the present invention.

What is claimed is:

1. A system for simulating an expression of a message, comprising a network platform end and at least a user end, wherein the network platform end communicates with the at least user end through a communication network, and wherein
   the network platform end comprises:
   a message capturing module for capturing a user message;
   a feature analyzing module for performing a characteristic analysis on a message content of the user message so as to mark at least one simulation action tag on the message content;
   a simulation message generating module for acquiring a plurality of simulation instructions corresponding to the at least one simulation action tag and comprising starting and ending time points of emotional features and combining the simulation instructions with the message content to generate a simulation message; and
   a simulation instruction database for recording at least one simulation instruction corresponding to each of the at least one simulation action tags and for sharing the customized simulation instructions with other users;
   the user end comprises:
   a user device comprising a network module for receiving the simulation message through the communication network and a driving module for outputting the message content and the simulation instructions contained in the simulation message; and
   a simulation device for receiving the message content and the simulation instructions from the driving module and for playing the received message content and executing the corresponding simulation instructions and for receiving customized simulation instructions from the user device and uploading the customized simulation instructions to the simulation instruction database.

2. The system of claim 1, wherein the feature analyzing module comprises:
   an emotion feature recognition unit for recognizing at least an emotion feature in the message content; and
   a simulation action tagging unit for tagging each of the at least emotion feature the corresponding simulation action tag, wherein the simulation action tag includes an activated time of the at least emotion feature appearing in the message content.

3. The system of claim 2, wherein the simulation device executes the simulation instructions according to the activated time of the corresponding simulation action tag while playing the message content.

4. The system of claim 1, wherein the simulation device executes each of the simulation instructions for generating at least a simulation response action.

5. The system of claim 1, wherein the network platform end further comprises:
   a user database for recording the simulation device corresponding to the at least user end, wherein
   the simulation instruction database further records at least one simulation instruction corresponding to each of the at least one simulation action tag for the corresponding one of a plurality of simulation devices; and
   the simulation message generating module acquires at least one instruction corresponding to each of the at least one simulation action tag for the corresponding simulation device with respect to one of the at least user end according to the user database and the simulation instruction database, and combines the acquired at least simulation instruction with the message content to generate the simulation message.

6. The system of claim 1, wherein the simulation instruction database is further provided for a user to update at least one of the simulation instructions corresponding to the at least one simulation action tag.

7. The system of claim 1, wherein, the simulation message generating module further marks a time point of each of the emotion features appearing in the message content in the simulation instructions, and when the simulation device plays the message content, the simulation instructions are executed respectively according to the corresponding time points.

8. The system of claim 1, wherein the simulation device comprises:
   an audio module for playing the message content in the simulation message.

9. The system of claim 8, wherein the simulation device further comprises:
   a display module, for executing the simulation instructions to display a simulation expression while the audio module plays the message content at the time point marked in the simulation instructions.

10. The system of claim 8, wherein the simulation device further comprises:
    an action module, for executing the simulation instructions to perform a simulation action while the audio module plays the message content at the time point marked in the simulation instructions.

11. The system of claim 8, wherein the simulation device further comprises:
    a converting module for converting the message content into a voice message through a text-to-speech technique for being played by the audio module.

12. A system for simulating an expression of a message, comprising a network platform end and at least a user end, wherein the network platform end communicates with the at least user end through a communication network, and wherein the user end comprises:
    a network module for receiving a message from the network platform end through the communication network;
    a feature analyzing module for performing a characteristic analysis on a message content of the message so as to mark at least a simulation action tag on the message content;
    a simulation message generating module for acquiring a plurality of simulation instructions corresponding to the at least one simulation action tag and combining the simulation instructions with the message content to generate a simulation message;
    a simulation instruction database for recording at least one simulation instruction corresponding to each of the at least one simulation action tags and for sharing uploaded customized simulation instructions with other users;
    a driving module for outputting the message content and the simulation instructions contained in the simulation message; and a simulation device for receiving the message content and the simulation instructions comprising starting and ending time points of emotional features from the driving module and for playing the received message content and executing the corresponding simulation instructions and for receiving customized simulation instructions from the user device and uploading the customized simulation instructions to the simulation instruction database.

13. A method for simulating an expression of a message, adapted to a network platform end, wherein the network platform end communicates with at least a user end through a communication network, the method comprising:

configuring the network platform end to perform:
   capturing a user message;
   performing a characteristic analysis on a message content of the user message so as to mark at least one simulation action tag on the message content;
   acquiring a plurality of simulation instructions corresponding to the at least one simulation action tags by querying a simulation instruction database for acquiring the simulation instructions, wherein the simulation instruction database records at least one simulation instruction corresponding to each of the at least one simulation action tag and contains customized simulation instructions uploaded by a user updating the at least one simulation instruction corresponding to each of the at least one simulation action tag and sharing the uploaded customized simulation instructions with other users, and combining the simulation instructions with the message content to generate a simulation message; and
   transmitting, by the communication network, the simulation message to a simulation device of the at least user end so that the simulation device executes each of the simulation instructions for generating at least a simulation response action.

14. The method of claim 13, wherein the step of performing the characteristic analysis on the message content of the user message so as to mark the at least simulation action tag on the message content comprises:
   recognizing at least an emotion feature in the message content; and
   tagging each of the at least emotion feature the corresponding simulation action tag, wherein the simulation action tag comprises an activated time of the corresponding emotion feature appearing in the message content.

15. The method of claim 13, wherein the step of generating the simulation message further comprises:
   Marking a time point of the corresponding emotion feature appearing in the message content in each of the simulation instructions.

16. The method of claim 15, wherein the step the simulation device executes each of the simulation instructions for generating at least a simulation response action comprises:
   playing the message content contained in the simulation message and executing the simulation instructions respectively according to the time points.

17. The method of claim 16, wherein the step of playing the message content contained in the simulation message further comprises:
   converting the message content into a voice message through a text-to-speech technique for being played.

* * * * *